US012422774B2

(12) United States Patent
Kanematsu

(10) Patent No.: US 12,422,774 B2
(45) Date of Patent: Sep. 23, 2025

(54) PRINTING SYSTEM, CONTROL METHOD THEREFOR, AND STORAGE MEDIUM

(71) Applicant: CANON KABUSHIKI KAISHA, Tokyo (JP)

(72) Inventor: Shinichi Kanematsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/585,546

(22) Filed: Feb. 23, 2024

(65) Prior Publication Data

US 2024/0295849 A1 Sep. 5, 2024

(30) Foreign Application Priority Data

Mar. 1, 2023 (JP) ................................ 2023-031382
Feb. 6, 2024 (JP) ................................ 2024-016089

(51) Int. Cl.
*G03G 15/00* (2006.01)

(52) U.S. Cl.
CPC ....... *G03G 15/6573* (2013.01); *G03G 15/502* (2013.01); *G03G 15/55* (2013.01); *G03G 2215/00426* (2013.01); *G03G 2215/00632* (2013.01)

(58) Field of Classification Search
CPC ........... G03G 15/6573; G03G 15/5016; G03G 15/502; G03G 15/55; G03G 2215/00421; G03G 2215/00426; B65H 2301/5133
See application file for complete search history.

(56) References Cited

U.S. PATENT DOCUMENTS

| | | | | |
|---|---|---|---|---|
| 2007/0063428 A1* | 3/2007 | Detloff | B65H 5/228 271/226 |
| 2008/0290591 A1* | 11/2008 | Shimizu | B65H 43/00 271/208 |
| 2021/0216031 A1* | 7/2021 | Tanaka | G03G 15/6535 |
| 2022/0179347 A1* | 6/2022 | Maruyama | G03G 15/6573 |

FOREIGN PATENT DOCUMENTS

JP H11258881 A 9/1999

* cited by examiner

*Primary Examiner* — Carla J Therrien
(74) *Attorney, Agent, or Firm* — Canon U.S.A., Inc. IP Division

(57) ABSTRACT

A method of controlling a printing system including a printing apparatus that prints an image on a sheet and a charge eliminating apparatus that performs a charge eliminating process on the sheet on which the image is printed includes measuring an amount of charge on the sheet that has undergone the charge eliminating process performed by the charge eliminating apparatus, and displaying a message prompting a user to change a setting for charge elimination to be performed by the charge eliminating apparatus in a case where the amount of charge on the sheet measured in the measuring does not fall within a predetermined range.

15 Claims, 12 Drawing Sheets

PRINTING SYSTEM, CONTROL METHOD THEREFOR, AND STORAGE MEDIUM

BACKGROUND

Field of the Disclosure

The present disclosure relates to a printing system, a method of controlling the printing system, and a storage medium.

Description of the Related Art

A recording medium (hereinafter, referred to as a "sheet") used in printing operation is conveyed while being charged with static electricity as residual charge in an electrophotographic process or due to slight friction with conveying rollers or guides generated during sheet conveyance. The static electricity can cause some sheets to stick to each other. In addition, the static electricity causes dust and paper powder to adhere to a printed sheet, degrading the quality of the printed sheet.

Some kinds of sheets, such as plain paper, have low electrical resistance, with which the charge easily moves in the paper, the amount of charge itself is small, and thus the charge is quickly eliminated. However, other kinds of sheets made of synthetic resin (plastic), such as thick paper, synthetic paper, and coated paper, have high electrical resistance, with which movement of the charge is unlikely to occur in the paper. As a result, these kinds of sheets, such as synthetic paper and coated paper, are more likely to be charged and to have residual charges. It is generally known that these kinds of sheet are easily affected by the environment, particularly the humidity, and because of the influence of decrease in the amount of electric discharge into the air with low humidity in the environment, these kinds of sheet are easily charged with static electricity.

If sheets sticking to each other undergo a post-process, the sheets would affect an alignment process of sheets. This would not only degrade the quality in the post-process, but also cause a sheet feeding failure or a conveyance failure in the post-process, resulting in a jam, which could damage sheets or devices.

In order to avoid such a risk, it is desirable to eliminate static electricity on a sheet after a printing process before a post-process is performed. Japanese Patent Application Laid-Open No. 11-258881 discusses a technique of applying a voltage to a pair of conveying rollers located downstream in a sheet conveying direction to neutralize electric charges on sheets.

Charge elimination with a configuration in which a voltage is applied to a conveying roller (hereinafter, referred to as "charge eliminating roller") involves giving a charge of the opposite polarity to a charge on a sheet via the charge eliminating roller to the sheet to neutralize the charge on the sheet. With this configuration, the amount of charge to be eliminated by the charge eliminating roller (application of a charge of the opposite polarity to the charge on the sheet to the charge eliminating roller) needs to be set in accordance with the amount of the charge on the sheet. In other words, there is an optimum charge adjustment value for charge elimination for each printing environment, such as humidity, and each type of sheet. The effect of charge elimination performed by the charge eliminating roller can vary depending on the condition, which requires that the user can check the effect of charge elimination of the printed sheet during the printing process. However, the user cannot determine whether the printed sheet with a sufficient effect of charge elimination is output during the printing process. As a result, some printed sheets with insufficient effects of charge elimination are output even though the printing apparatus includes the charge eliminating roller.

SUMMARY

Some embodiments of the present disclosure are directed to providing a printing system allowing charge elimination with an appropriate amount of charge in accordance with a printing environment and the type of a sheet.

According to an aspect of the present disclosure, a printing system including a printing apparatus that prints an image on a sheet and a charge eliminating apparatus that performs a charge eliminating process on the sheet on which the image is printed includes a measurement unit configured to measure an amount of charge on the sheet that has undergone the charge eliminating process performed by the charge eliminating apparatus, and a display unit configured to display a message for prompting a user to change a setting for charge elimination to be performed by the charge eliminating apparatus in a case where the amount of charge on the sheet measured in the measurement does not fall within a predetermined range.

Further features of various embodiments will become apparent from the following description of exemplary embodiments with reference to the attached drawings.

DESCRIPTION OF THE EMBODIMENTS

Hereinafter, an exemplary embodiment for implementing the present disclosure will be described with reference to the drawings.

The following exemplary embodiment does not limit every embodiment according to the appended claims, and not all combinations of features described in the exemplary embodiment are used for the solving means of every embodiment.

Entire Configuration of System

Figure 1:
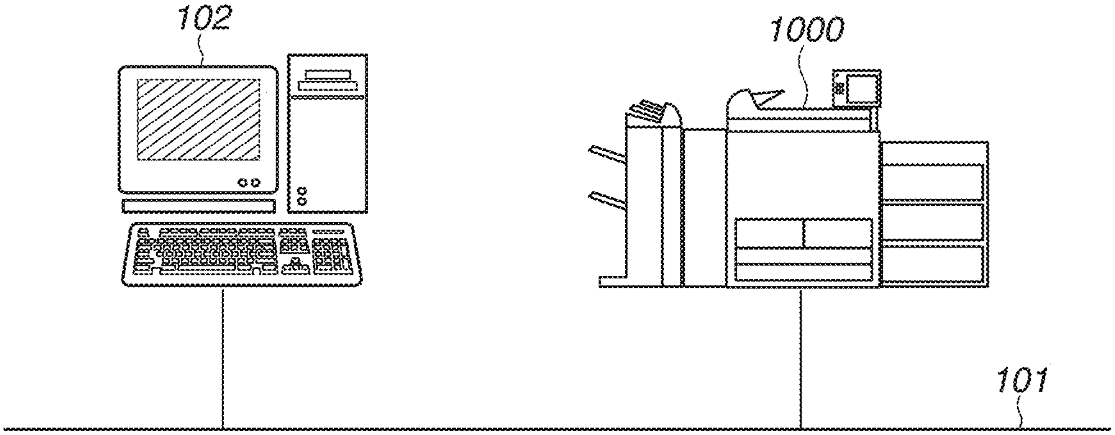
FIG. 1 is the entire configuration diagram of a system according to an exemplary embodiment.

FIG. 1 illustrates the entire configuration of a system according to the exemplary embodiment. The system includes a printing system 1000 and a client computer 102 (hereinafter, referred to as a "personal computer (PC) 102"). These are connected to each other via a network 101. The PC 102 can transmit page description language (PDL) code data as a print job to the printing system 1000 via the network 101.

Hardware Configuration of Printing System (Hardware Block Diagram)

Figure 2:
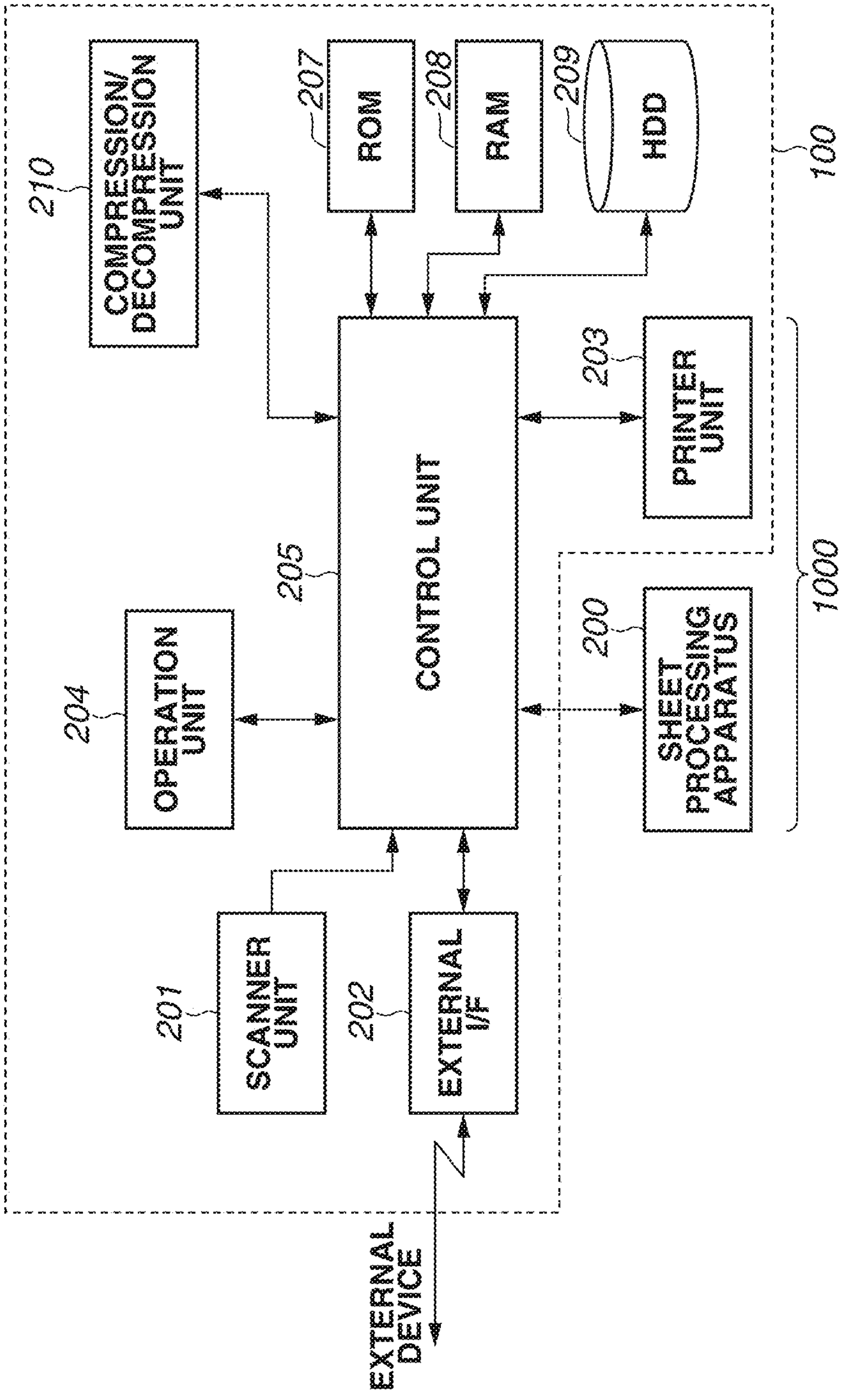
FIG. 2 is a hardware block diagram of a printing system.

FIG. 2 is a hardware block diagram of the printing system 1000. The printing system 1000 includes a printing apparatus 100, which is surrounded by a dotted line in FIG. 2, and a sheet processing apparatus 200. A desired number of the sheet processing apparatuses 200 can be connected to the printing apparatus 100. In the present exemplary embodiment, a multi-function peripheral (MFP) with a plurality of functions, such as a copy function and a printer function, will be described as an example of the printing apparatus 100. Alternatively, the printing apparatus 100 may be a single-function printing apparatus with only a copy function or a printer function.

In the printing system 1000, sheet processes can be performed on sheets printed by the printing apparatus 100 by the sheet processing apparatus 200 connected to the printing apparatus 100. Alternatively, the printing apparatus 100 can constitute the printing system 1000, with the sheet processing apparatus 200 disposed separately from the printing apparatus 100.

The sheet processing apparatus 200 can communicate with the printing apparatus 100, and perform a sheet process as described below in response to an instruction from the printing apparatus 100.

A scanner unit 201 reads an image on a document, converts the image into image data, and transfers the image data to another unit.

An external interface (I/F) 202 performs data transmission and reception with external devices connected to the network 101.

A printer unit 203 prints images based on input image data on sheets.

Figure 4:
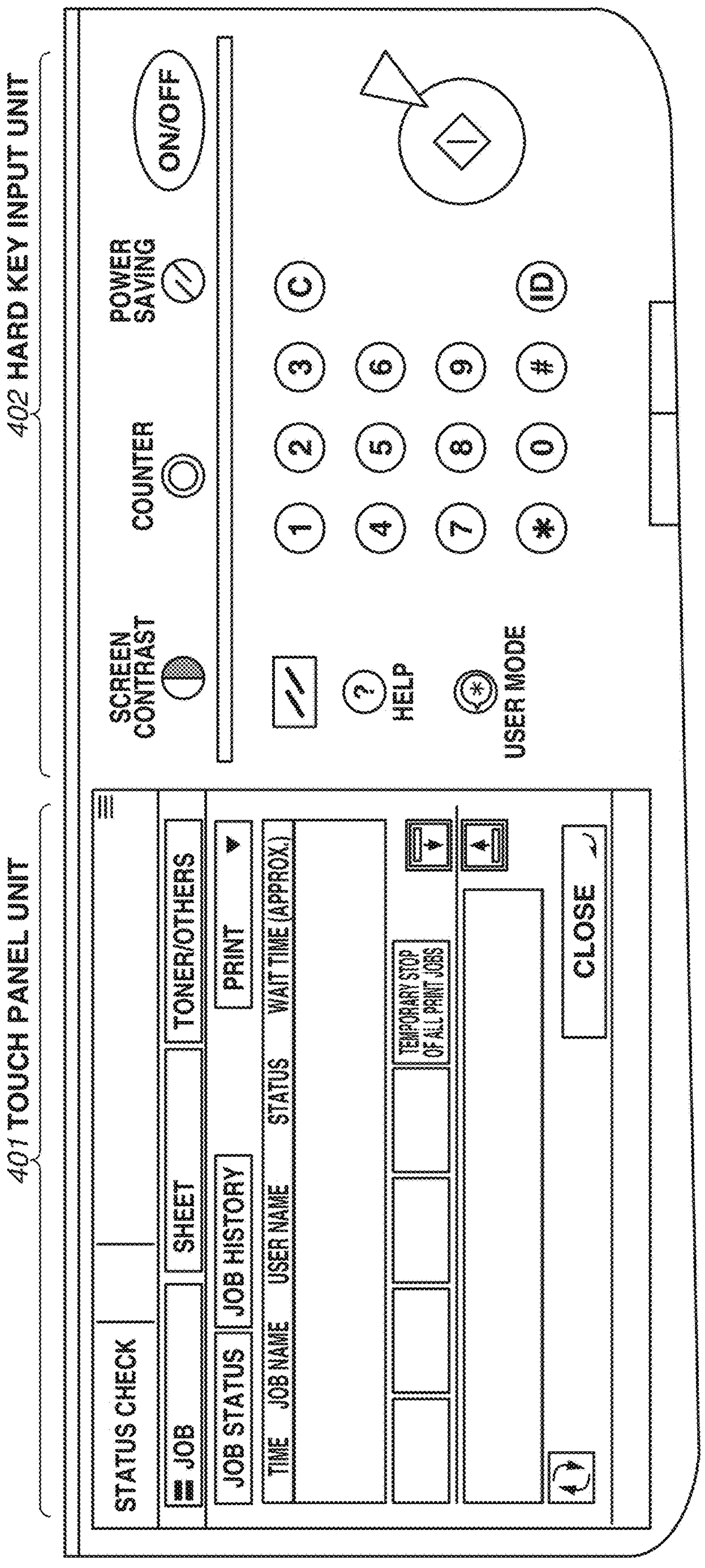
FIG. 4 is a layout diagram of an operation unit.

An operation unit 204 includes a touch panel unit 401 and a hard key input unit 402 as illustrated in FIG. 4, and receives instructions from users via these units. The operation unit 204 performs various kinds of display on the touch panel unit 401 included in the operation unit 204.

A control unit 205 integrally controls processes and operations performed by various units included in the printing system 1000. In other words, these operations to be controlled include operations of the printing apparatus 100 and the sheet processing apparatus 200 connected to the printing apparatus 100.

A read-only memory (ROM) 207 stores various computer programs executed by the control unit 205.

For example, the ROM 207 stores a program for causing the control unit 205 to perform various processes of a flowchart described below and a display control program for displaying various setting screens described below. The ROM 207 also stores a program for causing the control unit 205 to interpret PDL code data received from the PC 102 and process the PDL code data into raster image data. In addition, the ROM 207 stores a boot sequence, font information, and thresholds for amounts of charge for determining the effect of charge elimination described below.

A random-access memory (RAM) 208 stores image data sent from the scanner unit 201 and PDL code data from the external I/F 202, and various programs and setting information loaded from the ROM 207. The RAM 208 also stores information about the sheet processing apparatus 200 (information about the type and functions of the sheet processing apparatus 200 connected to the printing apparatus 100). The control unit 205 can use the information about the sheet processing apparatus 200 stored in the RAM 208 for control.

A hard-disk drive (HDD) 209 includes hard disks and a drive that reads and writes data from and to the hard disks. The HDD 209 is a large-capacity storage device for storing image data input from the scanner unit 201 and compressed by a compression/decompression unit 210.

The control unit 205 can cause the printer unit 203 to print image data stored in the HDD 209 based on an instruction from a user. The HDD 209 is also used as a spooler, and the control unit 205 can manage PDL code data received from the PC 102 as a print job and store it in the HDD 209. The control unit 205 can manage print jobs stored in the HDD 209 and also acquire the number of stored print jobs and setting information set in the print jobs.

The compression/decompression unit 210 performs compression/decompression operations on image data and other data stored in the RAM 208 and the HDD 209 by using various compression methods, such as Joint Bi-level Image Experts Group (JBIG) and Joint Photographic Experts Group (JPEG).

(Hardware Details)

Figure 3:
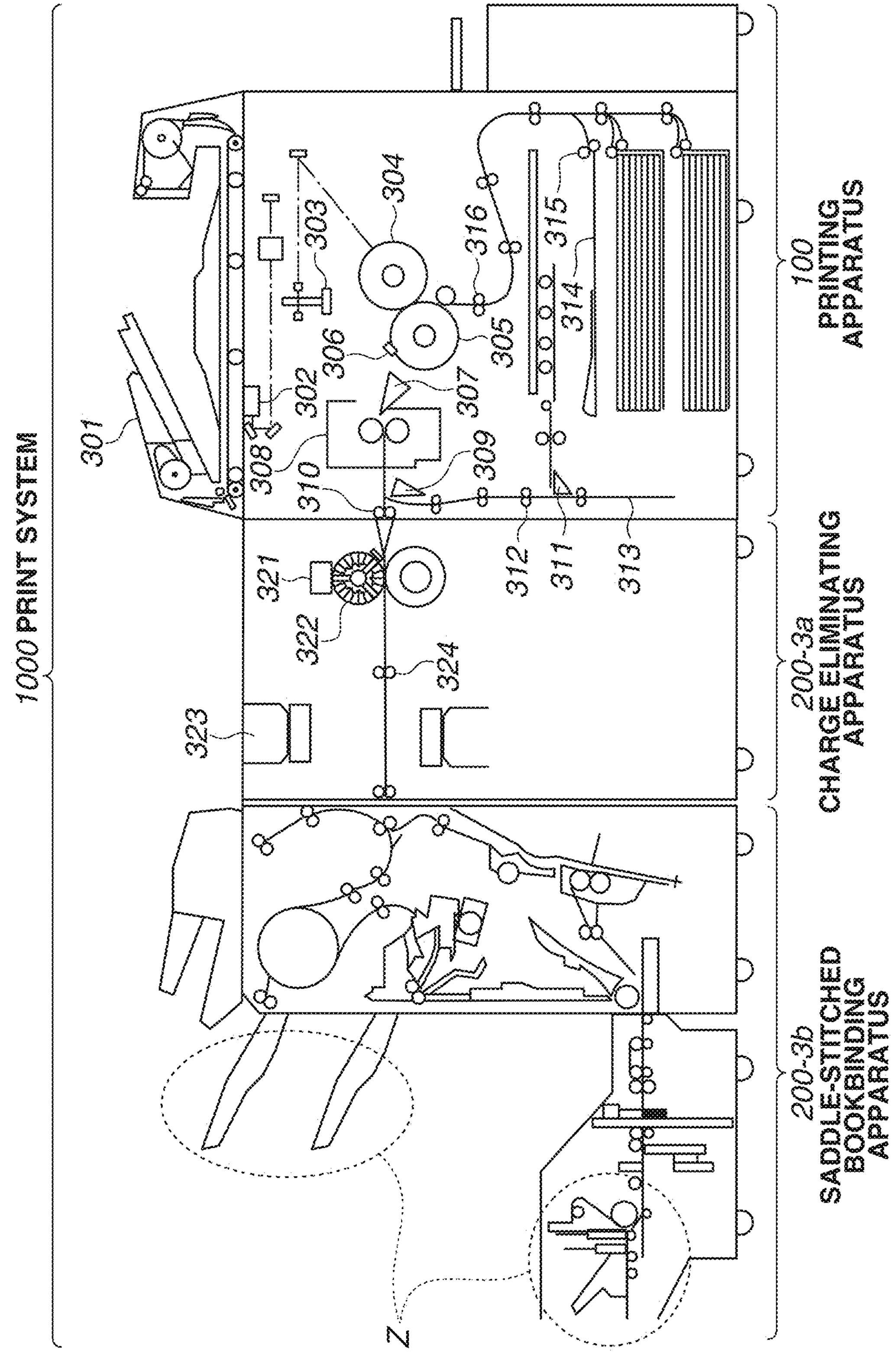
FIG. 3 is a hardware configuration diagram of the printing system.

A hardware configuration of the printing system 1000 will now be described with reference to FIG. 3. FIG. 3 is a sectional view of the printing apparatus 100 and the sheet processing apparatus 200 connected to the printing apparatus 100. The sheet processing apparatus 200 includes a charge eliminating apparatus 200-3*a* and a saddle-stitched bookbinding apparatus 200-3*b*.

First, the printing apparatus 100 will be described. An automatic document feeder (ADF) 301 separates a bundle of documents set on the stacking surface of a document tray in order of pages from the first page of the documents, and conveys the documents onto a document table glass for the scanner 302 to scan the documents.

The scanner 302 reads images of the documents conveyed on the document table glass, and a charge-coupled device (CCD) converts the images into image data.

A rotary polygon mirror (polygon mirror or another type of mirror) 303 causes light beams, such as laser beams, modulated in accordance with image data to be incident on a photosensitive drum 304 as reflected scanning light via a reflection mirror.

The laser beams form a latent image on the photosensitive drum 304, the latent image is developed with toner, and the toner image is transferred to a sheet attached on a transfer drum 305. This image forming process is sequentially performed with toners of yellow (Y), magenta (M), cyan (C), and black (K), forming a full-color image. After the image forming process is performed four times, the sheet on which the full-color image is formed on the transfer drum 305 is separated by a stripper finger 306, and is conveyed to a fixing device 308 by a pre-fixing conveying device 307.

The fixing device 308 is formed with a combination of rollers and a belt, and includes a heat source inside, such as a halogen heater. The fixing device 308 melts and fixes the toner, which is the toner image transferred on the sheet, by heat and pressure.

A sheet ejecting flapper 309 is swingable about its swing shaft to define the direction of conveying sheets. With the sheet ejecting flapper 309 swung in the clockwise direction in FIG. 3, the sheet is conveyed straight and ejected to the outside of the printing apparatus 100 by a sheet ejecting roller 310. The control unit 205 controls the printing apparatus 100 to perform simplex printing through the above-described sequence.

On the other hand, to form images on both sides of a sheet, the sheet ejecting flapper 309 is swung in the counterclockwise direction in FIG. 3, the path of the sheet is changed downward, and the sheet is sent to a duplex conveyance unit.

The duplex conveyance unit includes a reversing flapper 311, a reversing roller 312, a reversing guide 313, and a duplex tray 314.

The reversing flapper 311 is swung about its swing shaft to define the direction of conveying sheets. To process a duplex print job, the control unit 205 performs control to swing the reversing flapper 311 in the counterclockwise direction in FIG. 3 and feed the sheet of which a first surface has been printed by the printer unit 203 to the reversing guide 313 via the reversing roller 312. Then, the reversing roller 312 is temporarily stopped with the trailing end of the sheet nipped by the reversing roller 312, and the reversing flapper 311 is subsequently swung in the clockwise direction in FIG. 3. In addition, the reversing roller 312 is rotated in the reverse direction. This reverses and conveys the sheet, and the sheet is controlled to be guided to the duplex tray 314 with the trailing edge and the leading edge of the sheet being switched. The sheet is once put on the duplex tray 314, and then the sheet is sent to a registration roller 316 again by a re-feeding roller 315. At this time, the sheet has been fed with the surface opposite to the first surface of the sheet in the transfer process of the first surface facing the photosensitive drum 304. Then, an image for a second surface is formed on the second surface of the sheet similarly to the above-described process. Then, the images are formed on both sides of the sheet, and the sheet undergoes the fixing process, and is ejected from the inside of the main body of the printing apparatus 100 via the sheet ejecting roller 310 to the outside of the printing apparatus 100. The control unit 205 controls the printing apparatus 100 to perform the duplex printing process through the above-described sequence.

Charge Eliminating Apparatus

Figure 5:
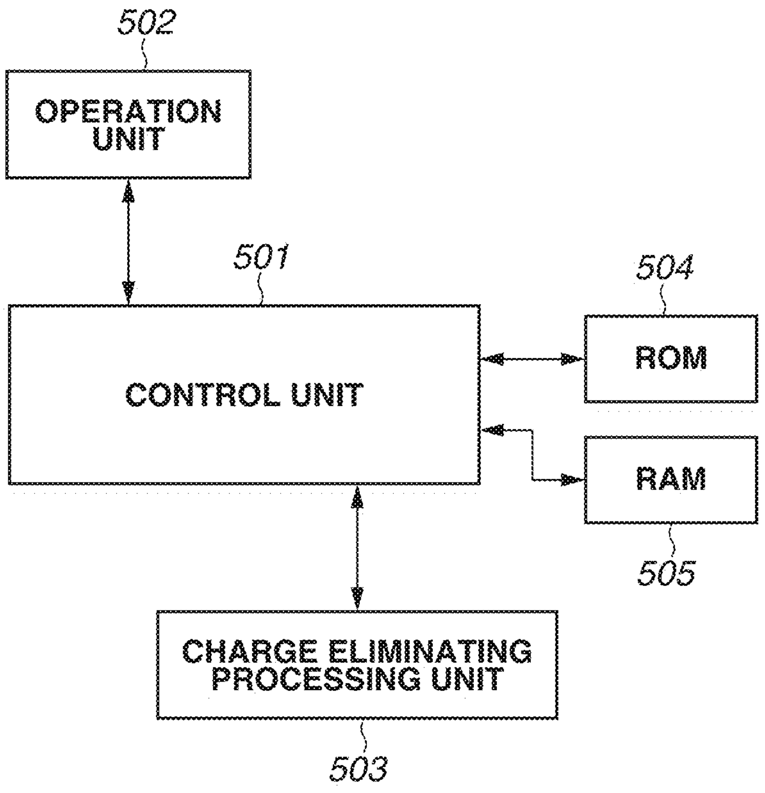
FIG. 5 is a system block diagram of a charge eliminating apparatus.

The charge eliminating apparatus 200-3*a* will now be described. FIG. 5 is a system block diagram of the charge eliminating apparatus 200-3*a*. The charge eliminating apparatus 200-3*a* also includes a control unit 501, which is separate from the printing apparatus 100. The control unit 501 integrally manages the entire charge eliminating apparatus 200-3*a* while communicating with the control unit 205 of the printing apparatus 100 in FIG. 2 via a bus (not illustrated).

(Operation Unit)

Figure 6:
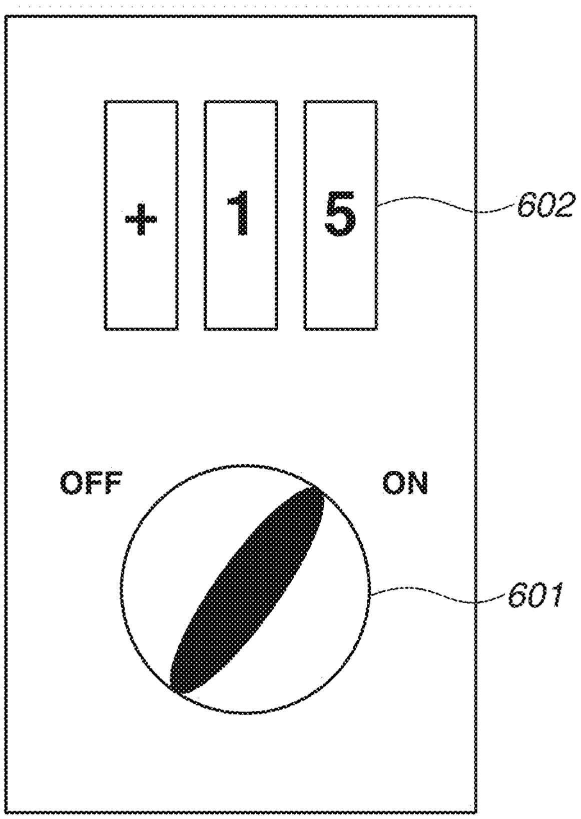
FIG. 6 is a diagram illustrating a mode setting switch.

An operation unit 502 is configured as illustrated in FIG. 6, and the user can perform settings for the charge eliminating apparatus 200-3*a* via the operation unit 502.

A mode setting switch 601 in FIG. 6 switches whether to perform charge elimination by the charge eliminating apparatus 200-3*a* (ON/OFF). The control unit 501 performs control to perform a charge eliminating process at a charge eliminating processing unit 503 described below only with the switch turned ON.

An adjustment dial 602 as a thumb rotary switch is used for adjusting the intensity of charge eliminating control performed with the mode setting switch 601 turned ON, and is controlled by the control unit 501 to be activated only with the mode setting switch 601 turned ON.

The charge eliminating processing unit 503 includes a charge eliminating roller 322 and an ionizer 323, and a voltage application controller 321 for each of them, all of which will be described below, and is a unit that serves to perform the charge eliminating process on sheets conveyed in the charge eliminating processing unit 503. The control unit 501 performs control of applying voltages to the charge eliminating roller 322 via the voltage application controller 321 and the ionizer 323.

A ROM 504 stores a boot program for the charge eliminating apparatus 200-3*a*, a control program for the operation unit 502, a charge eliminating processing program for the charge eliminating processing unit 503, and other kinds of program. The control unit 501 loads a relevant program from the ROM 504 to the RAM 505 as appropriate and executes the program.

The charge eliminating process performed by the charge eliminating processing unit 503 will now be described with reference to FIG. 7.

(Charge Eliminating Process)

Figure 7:
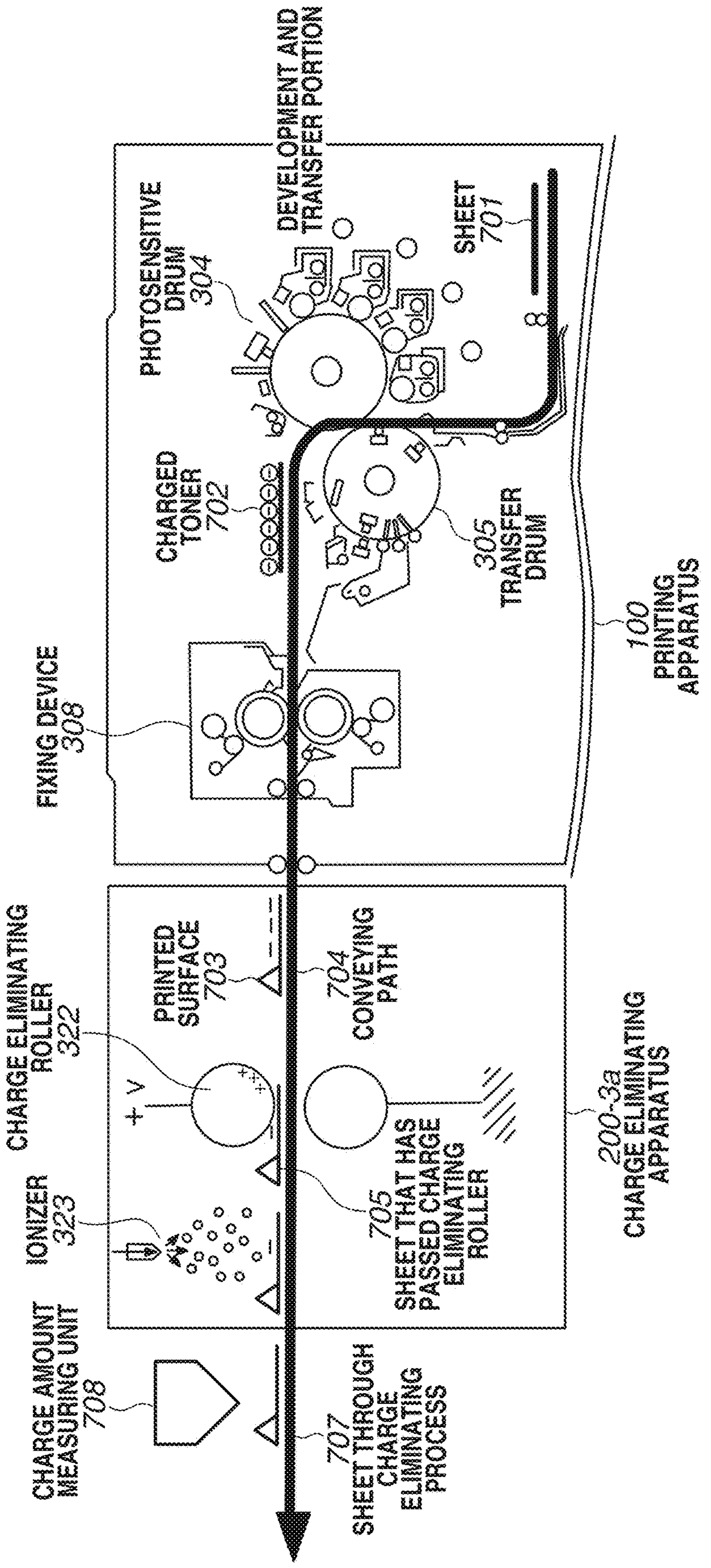
FIG. 7 is a schematic view of a charge eliminating process in the charge eliminating apparatus.

FIG. 7 is a schematic diagram illustrating the charge eliminating process performed by the charge eliminating apparatus 200-3*a* on a sheet that has undergone a printing process performed by the printing apparatus 100. First, a sheet 701 is conveyed to a development and transfer portion including the photosensitive drum 304 and the transfer drum 305 via a conveying path 704, and a charged toner 702 is placed on the sheet. The charged toner 702 on the sheet is negatively charged, and the sheet 701 to which the charged toner 702 is fixed by the fixing device 308 is conveyed to the charge eliminating apparatus 200-3*a* with a printed surface 703 negatively charged. The charge eliminating apparatus 200-3*a* includes the charge eliminating roller 322 charged positively (+). The charge eliminating roller 322 applies a positive charge to the printed surface 703 charged negatively (−) by contact charge elimination to clear the charged state. Further, it is assumed that a negative charge that has not been eliminated through the charge eliminating process performed by the charge eliminating roller 322 or a positive charge that has been reversely charged remains on a sheet 705 that has passed the charge eliminating roller 322. Thus, in the charge eliminating apparatus 200-3*a* according to the present exemplary embodiment, the ionizer 323 is disposed downstream from the charge eliminating roller 322. The ionizer 323 is a device that generates corona discharge by applying a voltage to an electrode needle provided in the device and eliminates a charge using ions generated by the corona discharge. In this way, the charge on the printed surface 703 is roughly eliminated by the charge eliminating roller 322, and the residual charge is adjusted by the ionizer 323, bringing the sheet 707 that has undergone the charge eliminating process and is ejected from the charge eliminating processing 200-3*a* into being in a state where the charge is eliminated. In the present exemplary embodiment, a charge amount measuring unit 708 that measures amounts of charge on a sheet after the printing process is further provided, and is connected so as to be able to notify measured numerical values.

Here, returning to the description using the sectional view of FIG. 3, the charge eliminating apparatus 200-3*a* includes the charge eliminating roller 322 and a roller paired with the charge eliminating roller 322. A sheet conveyed to the charge eliminating apparatus 200-3*a* is conveyed and subjected to the above-described rough charge elimination performed by the charge eliminating roller 322 while being sandwiched between the rollers. Thereafter, the sheet is conveyed to the outside of the charge eliminating apparatus 200-3*a* by a conveying roller 324, and the charge eliminating process for the residual charge on the sheet is performed by the ionizer 323.

(Saddle-Stitched Bookbinding Apparatus)

The saddle-stitched bookbinding apparatus 200-3*b* will now be described. The sheet processes performed by the saddle-stitched bookbinding apparatus 200-3*b* includes, for example, a saddle stitching process, a punching process, a cutting process, a shift sheet ejecting process, a folding process, and a stapling process. These jobs are referred to as "saddle-stitched bookbinding jobs".

To process a saddle-stitched bookbinding job, first, the control unit 205 conveys the sheets of the job printed by the printing apparatus 100 to the saddle-stitched bookbinding apparatus 200-3*b*, and then causes the saddle-stitched bookbinding apparatus 200-3*b* to perform the sheet process(es) of the job. The control unit 205 causes a sheet ejecting destination Z of the saddle-stitched bookbinding apparatus 200-3*b* to hold the printed sheets of the saddle-stitched bookbinding job, the printed sheets having undergone the sheet process(es) performed by the saddle-stitched bookbinding apparatus 200-3*b*. The sheet ejecting destination Z includes a plurality of sheet ejecting destination candidates. These candidates are used when the saddle-stitched bookbinding apparatus 200-3*b* can perform a plurality of types of sheet process and a sheet ejecting destination is assigned to the corresponding sheet process of the sheet processes. In the present exemplary embodiment, a detailed description of a conveyance procedure of the saddle-stitched bookbinding job will be omitted.

Printing Process Procedure

Figure 8:
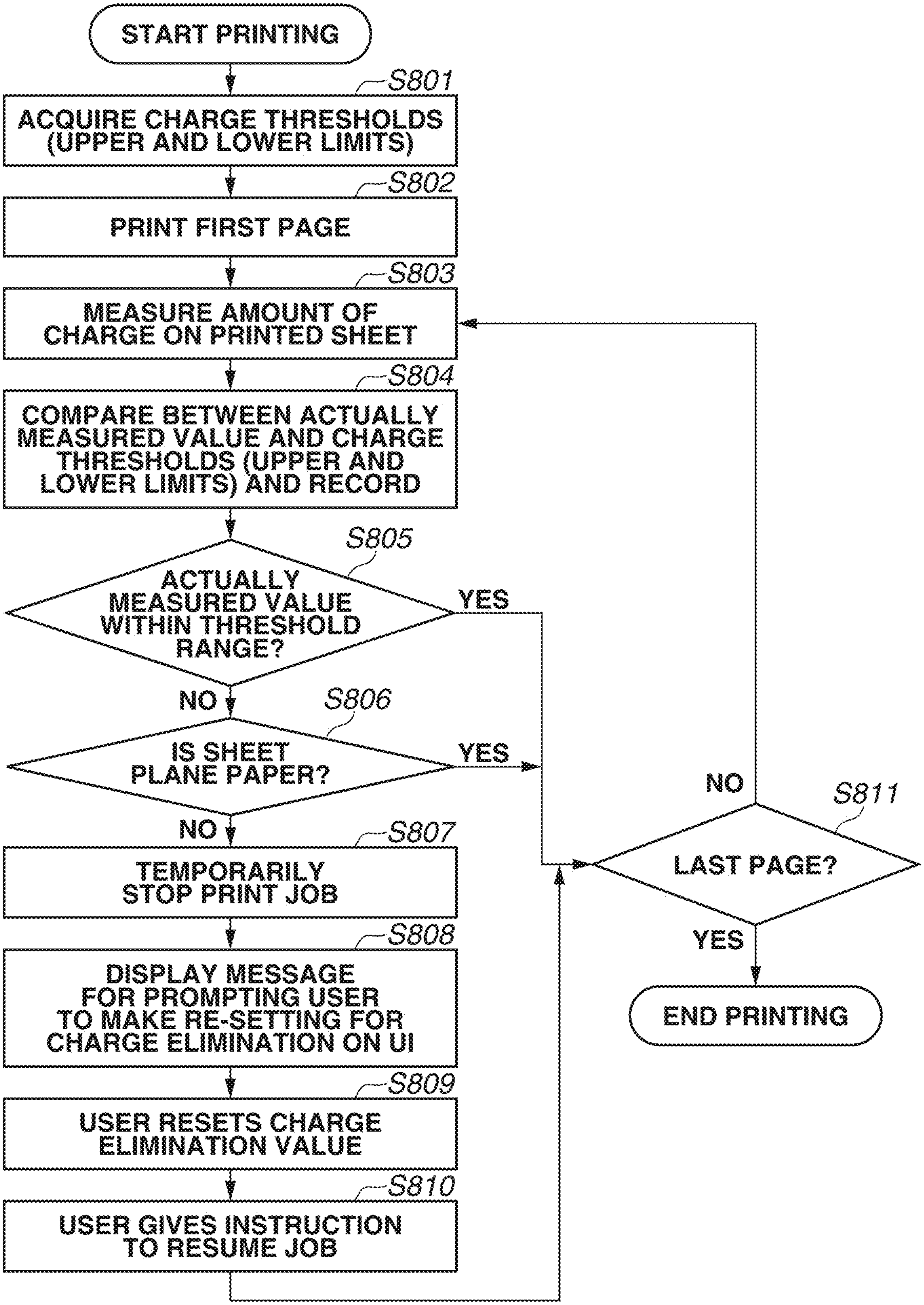
FIG. 8 is a flowchart of a printing process.

A printing process executed by the printing system 1000 will now be described with reference to the flowchart of FIG. 8 and using display examples of user interface (UI) screens of the touch panel unit 401 of the operation unit in FIGS. 9, 10, 11, and 12. This printing process is implemented by the control unit 205, which is a central processing unit (CPU), loading programs stored in the ROM 207 and the HDD 209 into the RAM 208 and executing the programs.

This printing process is started when a print job is input to the printing system 1000.

In step S801, the control unit 205 reads the threshold data for determining the effect of charge elimination of a printed sheet that is output from the ROM 207, and stores the threshold data in the RAM 208 while the job is being executed. The charge threshold data in the present exemplary embodiment includes two values, i.e., an upper limit and a lower limit.

In step S802, the control unit 205 controls the printing apparatus 100 to performs a print process on the first page, and the charge eliminating apparatus 200-3*a* to perform the charge eliminating process on the sheet 707.

Subsequently, in step S803, the control unit 205 controls the charge amount measuring unit 708 to measure amounts of charge on the sheet 707 that has undergone the charge eliminating process performed by the charge eliminating apparatus 200-3*a*. The control unit 205 receives a notification of measured numerical values as the amounts of charge.

In step S804, the control unit 205 compares the measured amounts of charge with the predetermined charge threshold data stored in the RAM 208. In the comparison performed here, two determinations are made: whether the effect of charge elimination is sufficient because the numerical values as the amounts of charge on the sheet 707 are smaller than the threshold as the upper limit, and whether the charge elimination is excessive and the sheet is reversely charged because the numerical values as the amounts of charge on the sheet 707 are greater than the threshold as the lower limit. The determination results and the actually measured values are recorded in the HDD 209, and are referred to in subsequent steps S805 and S808.

In step S805, the control unit 205 refers to an upper limit and a lower limit of the amounts of charge of the actually measured values recorded in the HDD 209 in step S804, and determines whether both the upper limit and the lower limit fall within the range between the predetermined thresholds. If the actually measured values fall within the range between the thresholds (YES in step S805), the printing process proceeds to step S811 and the printing process is continued. If the actually measured values do not fall within the range between the thresholds (NO in step S805), the printing process proceeds to step S806.

In step S811, it is determined whether the page is the last page. If the page is the last page (YES in step S811), the job is completed. If the page is not the last page (NO in step S811), the printing process returns to step S803, and the printing process is continued by repeating the procedure of step S803 and subsequent steps up to the last page.

In step S806, the control unit 205 determines the sheet type of the sheet. If the sheet type is plain paper (YES in step S806), the printing process proceeds to step S811 to continue the printing process. This is because even though the plain paper is charged, the charged state is quickly cleared. Thus, even if the plain paper is in the charged state in which a numerical value as an amount of charge of the plain paper exceeds a predetermined threshold, no treatment is required because the charged state does not cause the quality of the print output to be degraded. On the other hand, if the sheet type is a type other than the plain paper in step S806, for example, the sheet type is coated paper, in which amounts of charge can affect the quality of the printed sheet (NO in step S806), the control unit 205 advances the printing process to step S807.

In step S807, the control unit 205 sets the print job to a suspended state.

Figure 9:
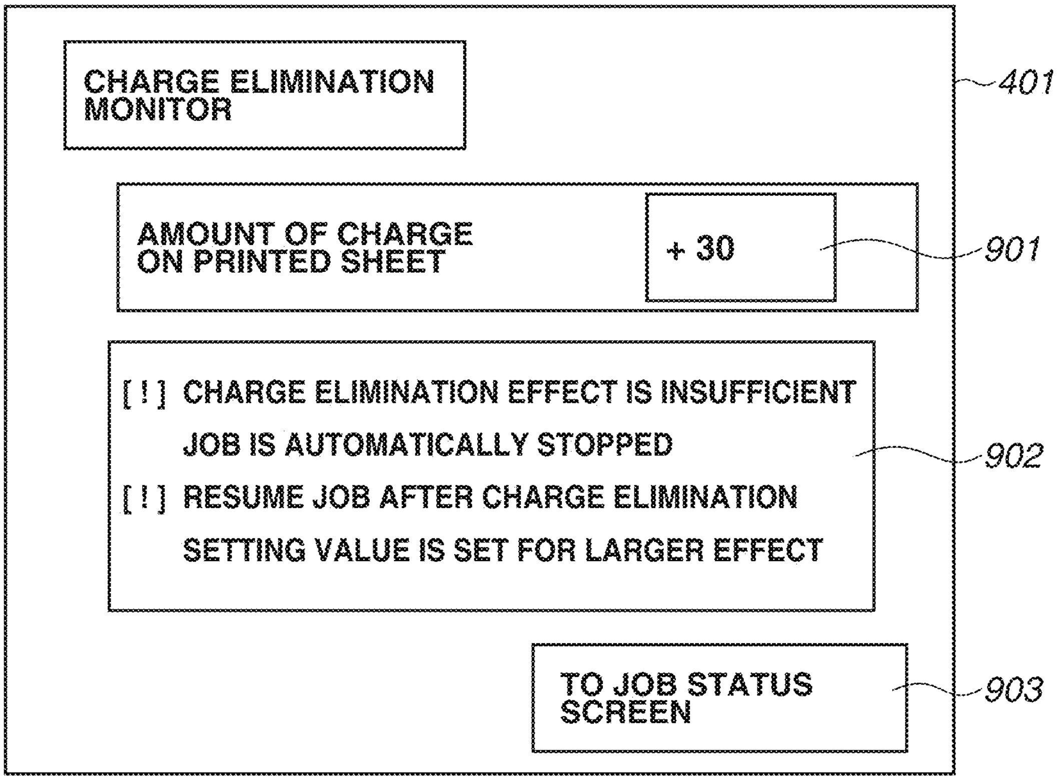
FIG. 9 is a display example of a user interface (UI) screen.
Figure 11:
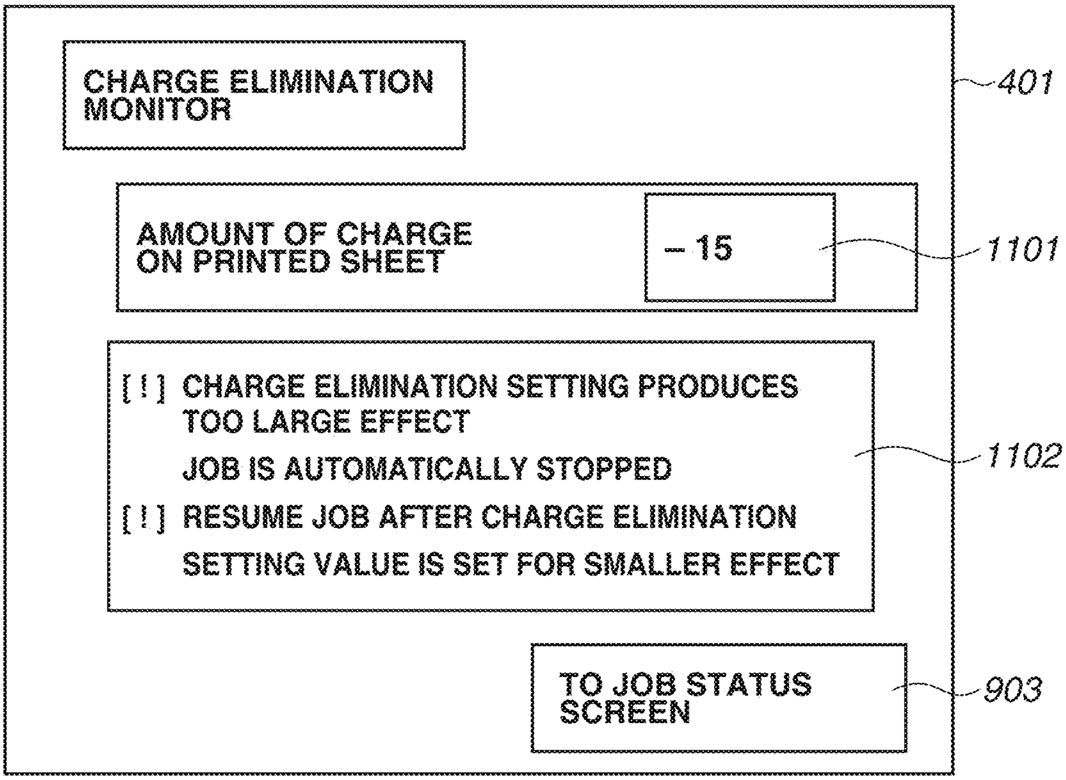
FIG. 11 is a display example of a UI screen.

Subsequently, in step S808, the control unit 205 displays, on the touch panel unit 401, a user UI screen for displaying a message for prompting the user to change a setting value for the amount of charge, as illustrated in FIG. 9 or 11, based on the determination results of the thresholds for the amounts of charge recorded in step S804. FIG. 9 illustrates a UI screen for monitoring the numerical values measured by the charge amount measuring unit 708 and notified to the control unit 205, and is an example of a display when a setting value for charge elimination produces a small effect and an amount of charge exceeding the threshold as the upper limit remains on the sheet 707. FIG. 11 illustrates an example of a UI screen displayed when a setting value for charge elimination produces a large effect, and the sheet 707 is reversely charged and a numerical value as an amount of charge exceeds the lower limit as a charge threshold. An example of the UI screen of FIG. 9 will be described. The control unit 205 notifies the user that the effect of charge elimination is insufficient and that a job resumption operation is performed after the setting value for charge elimination is reset on the operation unit 502 of the charge eliminating apparatus 200-3*a* to produce a larger effect, in a message area of a field 902, while displaying the current measurement value in a field 901.

In step S809, the control unit 205 acquires the setting value for charge elimination to produce a larger effect reset by the user on the UI screen, and transmits the setting value for charge elimination to the charge eliminating apparatus 200-3*a*.

When a "to job status screen" button 903 in FIG. 9 is pressed, the printing process proceeds to step S810.

Figure 10:
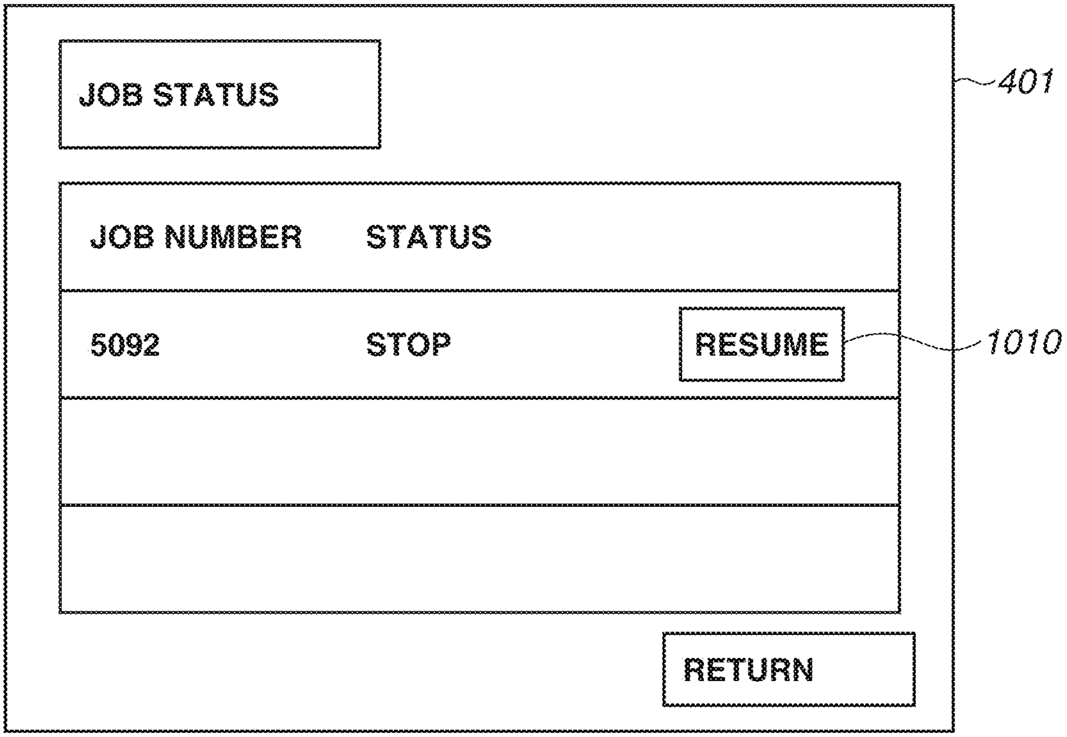
FIG. 10 is a display example of a UI screen.

In step S810, the control unit 205 displays a job status screen illustrated in FIG. 10 on the touch panel unit 401. When a "Resume" button 1010 is further pressed for the suspended job, the suspended job is resumed with the newly set value for charge elimination, and the printing process proceeds to step S811. Thereafter, the above-described procedure is repeated up to the last page of the job.

In the determinations in step S805, if the setting value for charge elimination produces a too large effect and a value as an amount of charge exceeds the lower limit, it is necessary to prompt the user to reset the setting value for charge elimination to produce a smaller effect. In this case, the control unit 205 displays the screen and a message illustrated in FIG. 11 on the touch panel unit 401. The subsequent procedure is the same as that in the case where the set value for charge elimination produces a small effect.

Figure 12:
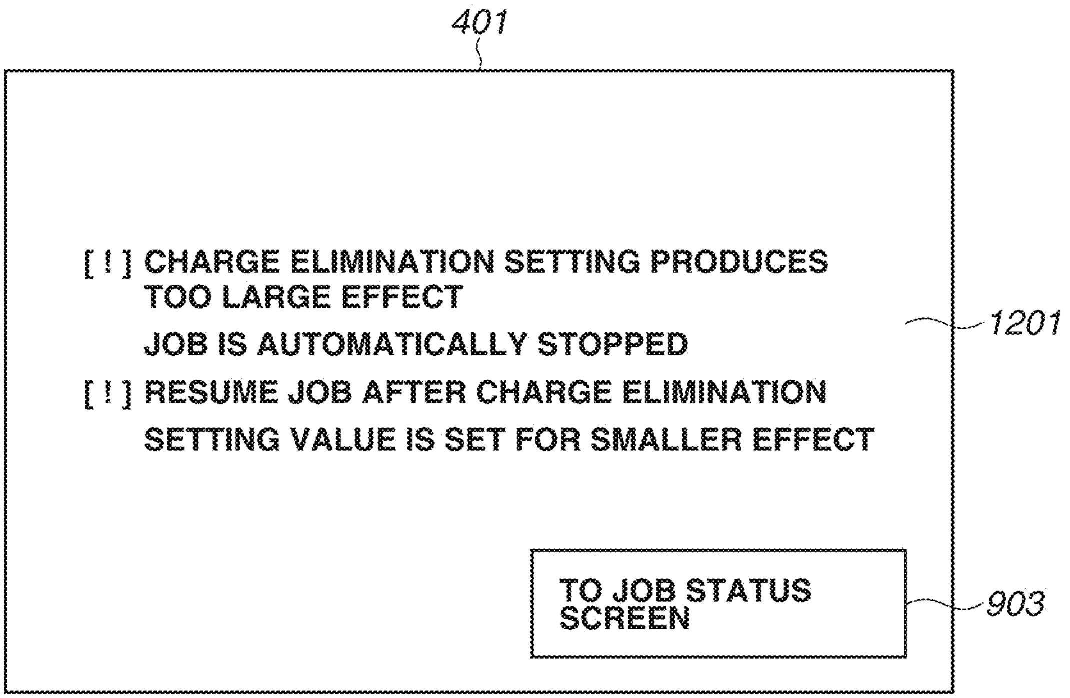
FIG. 12 is a display example of a UI screen.

Further, the examples of FIGS. 9 and 11 are display examples in the state where the user opens a charge elimination monitor screen. Alternatively, when a screen other than the charge elimination monitor screen is displayed, a message may be displayed on the entire screen of the touch panel unit 401 in order to notify the user of a situation. FIG. 12 illustrates an example of a UI screen for displaying a message in an entire-screen display. Similarly, methods for displaying on the touch panel unit 401 may be various methods, such as displaying a pop-up window and displaying a message line at the lower part of a screen.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-031382, which was filed on Mar. 1, 2023, and No. 2024-016089, which was filed on filed Feb. 6, 2024, which are hereby incorporated by reference herein in its entirety.

What is claimed is:

1. A printing system comprising:

a printing apparatus that is configured to print an image on a sheet;

a charge eliminating apparatus that performs a charge eliminating process, according to a setting value, on the sheet on which the image has been printed;

a measurement unit configured to measure an amount of charge on the sheet that has undergone the charge eliminating process performed by the charge eliminating apparatus; and a display unit configured to display a message for prompting a user to change the setting value for the charge eliminating process to be performed by the charge eliminating apparatus in a case where the amount of charge on the sheet that has undergone the charge eliminating process performed by the charge eliminating apparatus and that was measured in the measurement does not fall within a predetermined range.

2. The printing system according to claim 1, wherein the display unit further displays the amount of charge on the sheet measured by the measurement unit.

3. The printing system according to claim 1, further comprising a control unit configured to perform control to suspend a printing process in a case where the amount of charge on the sheet measured by the measurement unit does not fall within the predetermined range.

4. The printing system according to claim 1, wherein the printing system resumes a printing process in a case where the printing system receives an instruction to change the setting for the charge eliminating process to be performed by the charge eliminating apparatus and an instruction to resume the printing process.

5. The printing system according to claim 1, wherein the display unit displays information for prompting the user to set the setting value to produce a larger effect in a case where the charge eliminating process performed by the charge eliminating apparatus produces a small effect.

6. The printing system according to claim 1, wherein the display unit displays information for prompting the user to set the setting value to produce a smaller effect in a case where the charge eliminating process performed by the charge eliminating apparatus produces a large effect.

7. The printing system according to claim 1, wherein the charge eliminating apparatus can be set to an OFF state, can be set to an ON state, and, when set to the ON state, performs the charge eliminating process, according to the setting value, on the sheet on which the image has been printed.

8. The printing system according to claim 7, further comprising:

a first control for setting the charge eliminating apparatus to either the OFF state or the ON state; and a second control for changing the setting value.

9. The printing system according to claim 1, wherein the setting value controls an amount of static elimination performed by the charge eliminating apparatus during the charge eliminating process.

10. The printing system according to claim 9, wherein the setting value can be set to any one of a plurality of values that are greater than zero, and wherein the sheet that has undergone the charge eliminating process performed by the charge eliminating apparatus has undergone the charge eliminating process according to one of the plurality of values that are greater than zero.

11. A method of controlling a printing system including a printing apparatus that prints an image on a sheet and a charge eliminating apparatus that performs a charge eliminating process on the sheet on which the image is printed, the method comprising:

performing a charge eliminating process on a sheet on which an image has been printed by a printing apparatus, wherein the charge eliminating process is performed by a charge eliminating apparatus according to a setting value;

measuring an amount of charge on the sheet that has undergone the charge eliminating process performed by the charge eliminating apparatus; and displaying a message prompting a user to change the setting value for the charge eliminating process to be performed by the charge eliminating apparatus in a case where the amount of charge on the sheet that has undergone the charge eliminating process performed by the charge eliminating apparatus and that was measured in the measuring does not fall within a predetermined range.

12. The method according to claim 11, wherein the charge eliminating apparatus can be set to an OFF state, can be set to an ON state, and, when set to the ON state, performs the charge eliminating process, according to the setting value, on the sheet on which the image has been printed.

13. The method according to claim 11, wherein the setting value controls an amount of static elimination performed by the charge eliminating apparatus during the charge eliminating process.

14. The method according to claim 13, wherein the setting value can be set to any one of a plurality of values that are greater than zero, and wherein the sheet that has undergone the charge eliminating process performed by the charge eliminating apparatus has undergone the charge eliminating process according to one of the plurality of values that are greater than zero.

15. A non-transitory computer-readable storage medium storing computer-executable instructions for causing a computer to execute a control method for a printing system including a printing apparatus that prints an image on a sheet and a charge eliminating apparatus that performs a charge eliminating process on the sheet on which the image is printed, the control method comprising:

performing a charge eliminating process on a sheet on which an image has been printed by a printing apparatus, wherein the charge eliminating process is performed by a charge eliminating apparatus according to a setting value;

measuring an amount of charge on the sheet that has undergone the charge eliminating process performed by the charge eliminating apparatus; and displaying a message for prompting a user to change the setting value for the charge eliminating process to be performed by the charge eliminating apparatus in a case where the amount of charge on the sheet that has undergone the charge eliminating process performed by the charge eliminating apparatus and that was measured in the measurement does not fall within a predetermined range.

* * * * *